June 22, 1965 F. T. PISANO 3,190,588
AIRCRAFT CANOPY ACTUATOR
Filed April 3, 1964 2 Sheets-Sheet 1

INVENTOR:
FRANK T. PISANO
BY Harry M. Saragovitz
Edward Kelly, Herbert Berl
S. Dubroff
ATTORNEYS June 22, 1965  F. T. PISANO  3,190,588
AIRCRAFT CANOPY ACTUATOR
Filed April 3, 1964  2 Sheets-Sheet 2

INVENTOR.
FRANK T. PISANO
ATTORNEYS 3,190,588
AIRCRAFT CANOPY ACTUATOR
Frank T. Pisano, Kirkwood, N.J., assignor to the United
States of America as represented by the Secretary of
the Army
Filed Apr. 3, 1964, Ser. No. 357,333
7 Claims. (Cl. 244—121)
(Granted under Title 35, U.S. Code (1952), sec. 266)

The invention described herein may be manufactured and used by or for the Government for governmental purposes without the payment to me of any royalty thereon.

This invention relates to an aircraft canopy actuating mechanism and has for an object to provide such a mechanism which is capable of acting as a remover to unlock and jettison the canopy in case of emergency for the escape of personnel and also to provide greater convenience for opening and closing the canopy in servicing the canopy than has any known existing actuator-remover. Another object is to provide such an actuator-remover that is capable of allowing lighter weight frame members to be used in the aircraft construction and therefore become a closer approach to the goal of all makers and users of aircraft, namely an aircraft of lighter weight consistent with strength.

Heretofore the aircraft canopy has been pressurized for use at high altitudes where the air pressure is much lower, but this has previously required added strength in the aircraft frame members to withstand the stresses imposed on them due to the expansion of the canopy in rarefied atmospheres. In the practice of this invention such additional strength is unnecessary, yet the aircraft is safe. In accordance with this invention, expansion and contraction stresses due to the pressurized canopy no longer need to be transmitted in such measure as formerly to the frame members.

Prior electrical actuators for a canopy could not be removed or opened in event of power failure without removing a pin connecting the actuator to the aircraft. This was inconvenient and might require cutting a hole to remove such pin before the canopy could be manually opened. Fluid pressure actuators could be opened in event of power failure but were dangerous. In event of a leak the pressure might drop causing the canopy to come down on a workman's head and injure him. Under the present invention these disadvantages have been overcome.

Specifically an electric motor drive is employed to lower an already raised canopy and is capable of holding the canopy in raised position. The canopy may be raised either manually or by motor through a particular type of lost motion connection, which, upon removal of the electric or manual lifting force, will hold the canopy open and not allow it to fall. When the canopy is locked and a clutch is disengaged, this connection allows expansion and contraction of the canopy, due to it being pressurized at ascension to high altitudes, without transmitting the forces of either expansion or contraction to the aircraft frame, thereby allowing lighter weight frame members to be used with safety.

Referring to the drawings.

Figure 1:
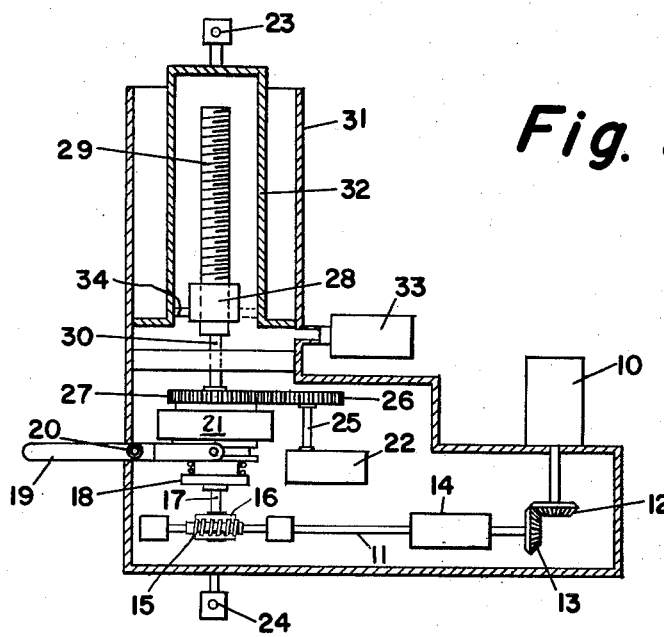
FIG. 1 is a representation of the preferred apparatus used in practicing this invention.

Referring to FIG. 1, an electric motor 10 drives a shaft 11 through bevel gears 12 and 13. A load limiting device 14 is keyed to shaft 11 and a worm 15 drives a worm wheel 16 on the input shaft 17. A clutch driving element 18 is shifted by a manually operated control arm 19 pivoted at 20 for causing a bifurcated end of arm 19 to move the clutch driving element to effect rotation of the driven element 21 shown hereinafter in more detail. A circuit opening index mechanism 22 opens the motor circuit and stops the motor after a predetermined opening movement of the canopy. An upper end connection 23 is provided for attachment to a canopy. This actuator-remover is connected at its lower end at 24 to an aircraft frame member to receive an opposite thrust to that for opening the canopy.

The index mechanism 22 is driven through a connection 25 from a gear 26 driven from gear 27 on the driven element 21 driving the output shaft 30. A ball nut 28 (containing a number of ball bearings) engages the screw 29 which is connected to output shaft 30. Upon rotation of screw 29 the nut 28 moves to effect its longitudinal translation with little torque in the output of driven shaft 30 under the weight of the canopy when not impeded.

For raising the canopy by means of the motor 10, the driven shaft 30 rotates in a counterclockwise direction (when viewed from the bottom or clutch end thereof) raising the ball nut 28 and the inner cylinder 32 through means including a frangible link or shear pin 34. The longitudinal translation of nut 28 effected by reversing the motor operation will lower cylinder 32 and canopy attaching means 23, the link 34 precluding rotation of the nut but allowing its linear translation as the screw rotates. An outer cylinder 31 guides upward and downward movement of the inner cylinder 32 with the canopy attached through the connection 23. For rapid ejection of a seat and occupant, the propellant in the gas generator 33 is fired, causing the inner cylinder 32 to be raised quickly rupturing link 34 and causing the canopy to be jettisoned. In event the gas generator may not function, the canopy is manually unlocked and the motor 10 started to raise the canopy enough for the wind to enter and blow the canopy off, thus rupturing link 34.

Figure 2:
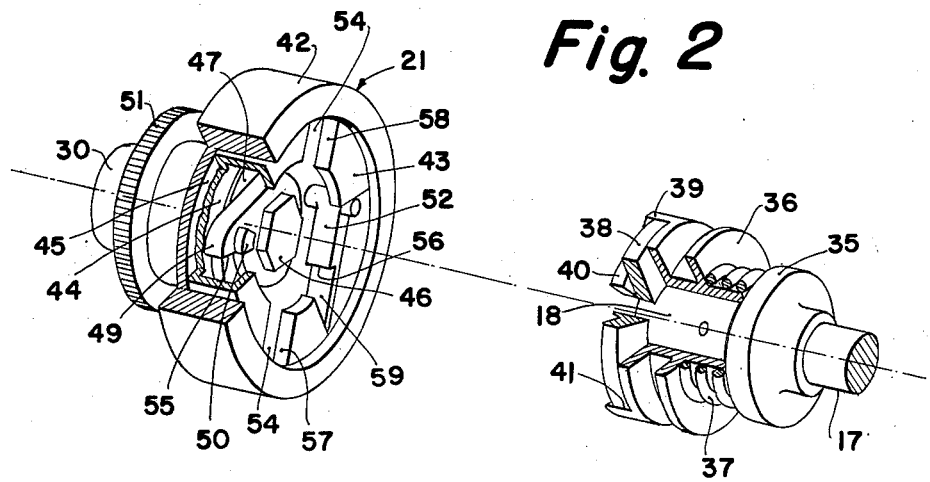
FIG. 2 shows the driving and driven parts of the clutch separated and with parts broken away.

In FIG. 2 the lower right portion denotes the shiftable clutch driving portion 18 of the input shaft 17 and including a retainer 35 fixed on shaft 17 as an abutment against which the clutch actuating spring 37 may press. A grooved claw 36 is slidable on shaft 17 under influence of the bifurcated clutch-engaging portion of the actuator 19 received in the groove of claw 36 for engaging and disengaging the clutch driving portions with the driven portion 21 of the clutch. Secured on shaft 17 is the ratch 38 having grooves 41 through which extend the tangs or projections 39 on the claw 36. Tangs 39 extend through grooves 41 in the ratch 38 and into grooves on slots 54 in the clutch driven element 21. Also on a side face of the ratch 38 toward the driven element is a tang or projection 40 for engaging a face 55 of pawl 49 within the driven element 21.

Figure 3:
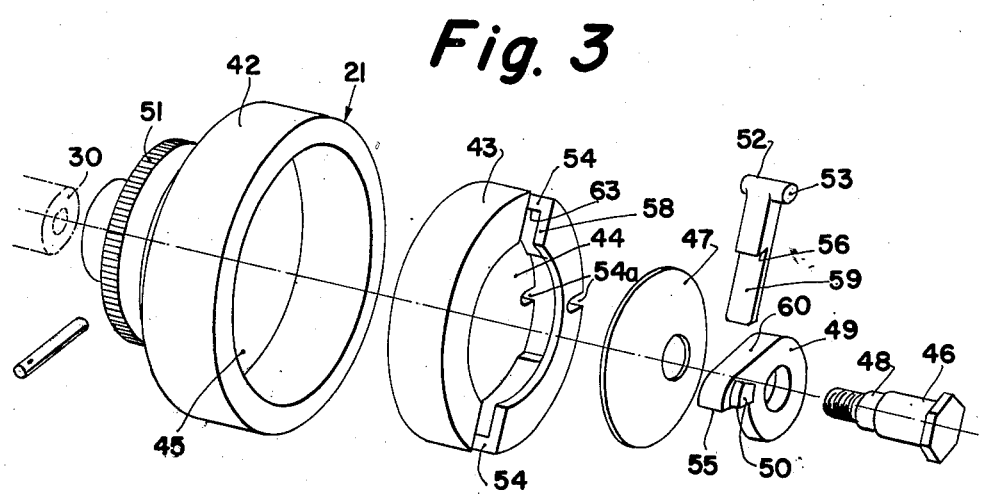
FIG. 3 is an exploded view of the driven part of the clutch containing the aforementioned lost motion connection.

This driven clutch element 21 is shown in both the upper part of FIG. 2 and in the exploded view in FIG. 3 as comprising two subclutch parts, a drum 42 and a cup 43, capable of functioning as friction clutch parts. The drum 42 is secured to the output shaft 30 and the cup 43 is operable within the drum. The left or upper side of the cup is a wall 44 having contact with the upper left or rear wall 45 of the drum. A screw 46 carries biasing means to hold the cup wall 44 against the drum wall 45, and the pawl 49 is held next to the head of screw 46. A Belleville spring washer 47 is convexed slightly to abut the shoulder 48 on screw 46 and press the base 44 of cup 43 yieldably against the drum rear wall 45 as the aforementioned friction clutch. A pawl tang or projection 50 is engaged on one of its opposite side faces by one of the opposite side faces of the tang 40 on the ratch 38. The detent 52 is positioned within cup 43 and has the opposite sides 53 of its T cross portion supported in the base of recesses 54A in the forward and rear walls of cup 43. When cup 43 is received within drum 42 and held in place, the detent 52 is held against the peripheral wall of the drum 42. The end face 55 of pawl 49 when assembled, engages the end face 56 of detent 52 for turning the output shaft 30 in a counterclockwise direction in raising the canopy. When the motor is reversed, the canopy is lowered merely by the engagement of tangs 39 in cup recess 54.

Figure 4:
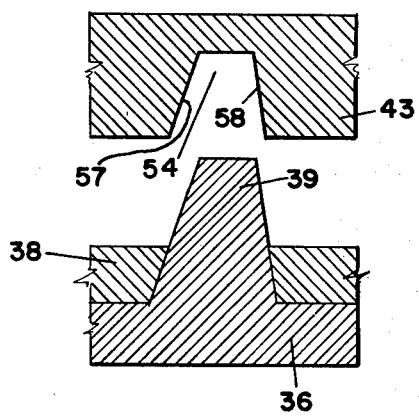
FIG. 4 is an enlarged developed view of the cup slot and claw tang to be engaged therein.

As shown in FIG. 4 recesses 54 in cup 43 have their side walls 57, for driving the cup from projections 39 of the claw 36, arranged to form an angle of 20° to the longitudinal axis when driving the cup in a counterclockwise direction, while the side walls 58 of the same recesses have an inclination of about 7½° to the same longitudinal axis. The tangs or projections 39 on claw 36 have their cooperating side faces similarly arranged. The reason is that when starting a counterclockwise rotation for upward movement of the canopy under power of the motor 10, the claw 36 and tang 39 will at first not hold and will come out compressing spring 37 to give time for the tang 40 on ratch 38 to move from the left side of the tang 50 on pawl 49, almost 360°, to engage the right side of tang 50 and then more time for the pawl 49 to rotate to engage its end face 55 with the end face 56 of detent 52. When the canopy is raised manually, the spring 59 is secured to detent 52 and is flexed during any counterclockwise rotation of the detent 52 over pawl 49.

In rotating the output shaft 30 and screw 29 for raising the canopy by motor 10, the motor is started under load in the correct direction to drive the output shaft 30 in FIGS. 2 and 3 in a counterclockwise direction causing ball nut 28 to be moved upward by screw 29 for raising the connection 23 secured to the canopy. The claw tangs 39 will at first be moved out of recesses 54 in the cup walls due to the mating sides having an inclination of 20° to the longitudinal axis. Thus the driving element 18 does not drive the driven element of the clutch at first. For nearly but not quite 360° of rotation of the input shaft the tang 40 on the ratch 38 moves from the left side to the right side of the tang 50 on the pawl 49 in FIG. 2. Then begins less than a full rotation of the pawl 49 until the pawl end face 55 engages the end face 56 of detent 52. At once the detent 52, cup 43, drum 42, output shaft 30 and screw 29 begin rotation in the intended counterclockwise direction raising ball nut 28 and the previously unlocked canopy. On reaching a predetermined location the index mechanism opens the motor circuit and the motor 10 stops. The weight of the canopy cannot cause rotation of the screw and output shaft in a clockwise direction for descent because the projection 40 on the ratch 38 is still on the right side of the tang 50 on pawl 49 and the ratch is fixed to the input shaft 17 and the motor is braked when not driving. Thus, the pawl and its tang are not free to rotate in such clockwise direction. However, when the motor 10 is reversed for driving the canopy downward the clockwise rotation of the ratch 38 is transmitted through the tangs 39 on the claw directly to the cup 43 for rotation of screw 29 for lowering the nut 28 and said canopy. On reaching a fully closed position the load limiting device 14 will open the motor circuit and stop the closing movement.

From a raised position the canopy cannot be lowered manually because as said before the motor is automatically braked and so are the input and output shafts 17 and 30 respectively while the clutch and its claw 36 are engaged with the cup 43. When closed the canopy may be unlocked and raised manually by raising a handle on the canopy with the clutch disengaged. In so doing the output shaft 30 rotates counterclockwise driving the cup 43 and carrying the detent 52 away from the pawl 49 and its end face 55. The detent 52 may pass over the pawl repeatedly when the cup and detent are moved in a counterclockwise direction in FIG. 2 by riding up the sloping side 60 of the pawl 49 as often as desired. Flexure of flat spring 59 secured to the detent 52 enables the detent to ride over the pawl, since the end of this spring always rests on the edge of the peripheral cover 63 of the cup 43. In this counterclockwise rotation of the detent and cup, the pawl moves away from its position (with the right face of the tang 50 touching the left face of the tang 40 of the now stationary ratch 38) until the pawl 49 and its tang 50 move counterclockwise to engage the opposite or right side of tang 40, after which the pawl rotates no further during upward manual movement of the canopy. On reaching the desired height for this manual opening and not beyond a limiting stop, and releasing the canopy from any upward thrust, the weight of the canopy will be sufficient to cause a limited lowering of the canopy until stopped. Such a lowering under gravity causes a clockwise movement of cup and detent 52 for nearly 360° until detent face 56 engages face 55 on the pawl 49, whereupon the pawl moves clockwise until its tang 50 engages tang 40 on the opposite or left side.

To enable expansion of the canopy at high altitudes to be possible without imposing stress upon the aircraft frame, the canopy is locked in closed position and the clutch is disengaged by movement of the grooved claw 36. Air pressure within the canopy at high altitudes cause expansion resulting in limited upward movement of connection 23 and counterclockwise gradual rotation of the output shaft somewhat similar to movement of the canopy when being raised slowly manually. After previous raising of the canopy by the motor, the tang 40 of the fixed ratch 38 was in contact with the right face of tang 50 on the pawl 49 as it was previously driving the cup and drum in a counterclockwise direction and remained in such position when the motor was closing and was stopped with the canopy closed. Since expansion of the canopy raises end connection 23, this causes counterclockwise rotation of the output shaft and pawl 49 for moving the pawl counterclockwise away from the stationary tang 40 on ratch 38. Such movement may be almost but not quite 360° until the pawl is moved far enough to engage the opposite or right face of the tang 40. This is 360° minus the total angular extent of tangs 40 and 50. In addition the detent and cup are free to be moved counterclockwise past the pawl any amount, but in practice it has been found the expansion of a canopy is not likely to cause more than about 1½ revolutions.

The 20° taper on one side of tang 39 and on the side 57 of recess 54 in cup 43 was selected because it was found sufficient to withdraw tang 39 and allow the stationary tang 40 on ratch 38 to effect the necessary counterclockwise rotation to get the pawl and detent into driving position. On power drive descent, the taper of 7½° does not allow any slippage for clockwise rotation of the canopy. A 7½° taper was selected in preference to having the recess and tang side without any taper because this small taper was found to facilitate clutch disengagement of the cup and claw tang.

In the described counterclockwise rotation the pawl is moved a desired amount before engaging the detent. This pawl ineffective rotation may be considered a lost motion device allowing as much as nearly 360° of rotation depending on where the tang 40 is located. In allowing free counterclockwise rotation of the cup independently of the pawl, there is no limit to corresponding counterclockwise movement of the detent past the pawl until the canopy has fully opened. The detent may be considered also as a lost motion connecting as well as a pawl and ratchet type connection with the pawl. The linear expansion of the canopy may be of the order of about ¼ of an inch, which corresponds to angular movement of the drum and cup for 1 to 1½ revolutions while the ratch 38 and claw 36 remain stationary. Normally, when opening and closing the canopy under power, there is no change in the position of the pawl and detent from their abutting position for driving the canopy. On closing the canopy, the drive is from tang 39 directly to the cup in a clockwise direction through the face 53 (FIGS. 3, 4). The friction clutch between the drum and cup absorbs any high transient load that may be encountered during operation. This friction clutch finds such a transient load upon closing of the canopy against its frame where it absorbs the shock of closing. The slip between the drum and cup serves as protection against rupture of the shear pin link 34. The peripheral recess in the rim or cover 63 of the cup 43 provides adequate space for movement of the detent as it moves up and over the gradually sloping side 60 of the pawl, and the flat spring 59 secured to the detent flexes, allowing positive return of the detent to the desired position independently of centrifugal force.

This invention allows structural expansion of a pressurized cabin as the aircraft ascends to high altitudes and structural contraction occurring on descent, without subjecting the canopy actuating mechanism to any expansion or contraction stresses.

Certain modifications or changes in construction may be resorted to in practicing the invention without departing from the scope thereof as defined in the appended claims.

I claim:

1. In an aircraft canopy actuator having means for raising and lowering a canopy under motive power, said means including a clutch, said clutch having selective lost motion connection, said connection rendering ineffective any force applied thereto by a canopy in expanding and contracting when not under said motive power.

2. In an apparatus for raising and lowering an aircraft canopy by a motor or for jettisoning the canopy in an emergency by propellant actuated device, an electric motor, transmission mechanism for raising and lowering said canopy with respect to a frame of an aircraft, said mechanism including a clutch, means for engaging and disengaging said clutch, a gas pressure generator, an outer cylinder connected to an aircraft frame, an inner cylinder connected to said canopy and movable longitudinally of said outer cylinder, said inner cylinder being responsive to gas pressure from said generator, a screw longitudinally positioned within said inner cylinder and rotatable by said motor, a ball nut on said screw within said inner cylinder and movable longitudinally for raising and lowering said canopy, and a frangible connection between said inner cylinder and said nut for removing said canopy under propellant gas pressure, the combination therewith of the improvement for confining expansion stress on canopy frame members due to a pressurized cabin and precluding its application to other aircraft frame members, said improvement including limited lost motion means within said clutch.

3. A canopy actuator comprising an electric motor, an input shaft, an output shaft, a screw rotatable with said output shaft, a ball nut receiving said screw and longitudinally translatable therealong, means connected to said nut to move therewith for moving said canopy upward and downward, a clutch between said input and output shafts, and a lost motion mechanism in said clutch responsive to torque in said output shaft when said clutch is disengaged.

4. An aircraft canopy actuator comprising motor means, mechanism for raising and lowering a canopy by said motor means, said mechanism having means for transmitting thrust through a different path when lowering said canopy than that when raising the canopy, said mechanism including a lost motion connection permitting vertical expansion of said canopy without rotation of said motor means.

5. A combination according to claim 4 in which said lost motion connection is ineffective when said canopy is lowered, and the motor acts as a brake when de-energized.

6. In an aircraft canopy actuator having a reversible motor, a screw driven by said motor, a ball nut moved longitudinally by said screw, a connection between said nut and an aircraft canopy for raising and lowering said canopy, a connection opposite that for said canopy and secured to an aircraft frame member to resist thrust incident to canopy movement, a load limiting device between said motor and screw, and a clutch between said load limiting device and said screw, the combination therewith of the improvement between said clutch and screw whereby said canopy may be opened manually but closed only with said motor operation to insure said canopy not accidentally falling on a workman and said improvement also including the ability of the canopy to expand and contract freely without imposing additional strains upon its frame members, said improvements including a driving shaft extending through said clutch, a projection on said shaft, a driven shaft capable of being engaged by said projection to preclude closing movement of said canopy when it has been opened manually, a telescoping drum and cup on said driven shaft, means within said drum and cup for limiting expansion and contraction movements of said canopy when said motor is idle and said clutch disengaged, said last means including a pawl within said cup and drum having limited movement under torque applied upon said driven shaft by said nut and screw as said canopy expands until such movement of said pawl is stopped by movement of said driving shaft projection, a detent carried by said cup and allowing additional movement of said driven shaft when under such torque contracting movement of said canopy transmitted through said drum and cup being limited by engagement of said pawl and said projection when said motor is de-energized.

7. A combination according to claim 6 in which a propellant gas generator is connected to said canopy connection for raising the same upon firing of said gas generator, whereby said canopy is raised quickly and permitted to jettison.

No references cited.

FERGUS S. MIDDLETON, *Primary Examiner.*